3,560,091
HIGH PRESSURE OPTICAL CELL
Alvin Van Valkenburg, McLean, and Ellis R. Lippincott, Vienna, Va., and Charles E. Weir, Washington, D.C., assignors to High Pressure Diamond Optics, Inc., McLean, Va.
Filed Apr. 12, 1968, Ser. No. 720,866
Int. Cl. G01b 11/16; G01n 1/00, 21/16
U.S. Cl. 356—32                                      2 Claims

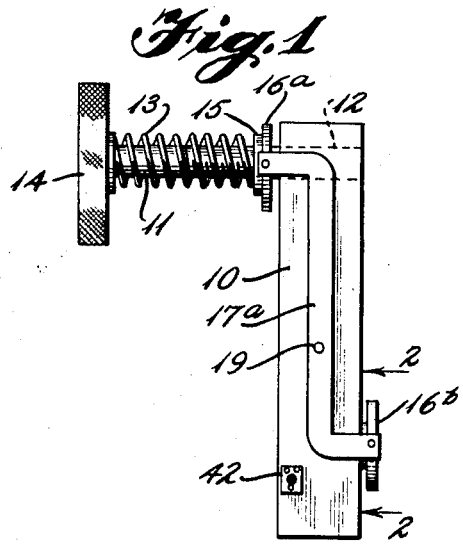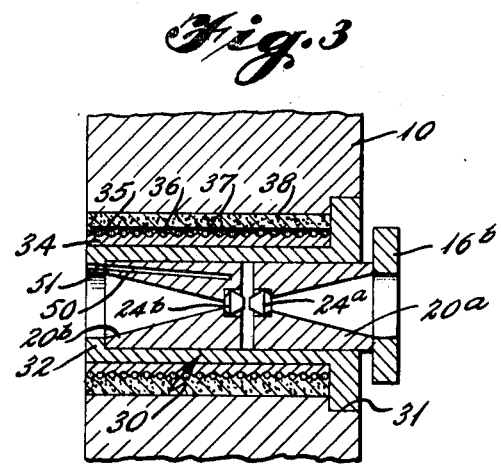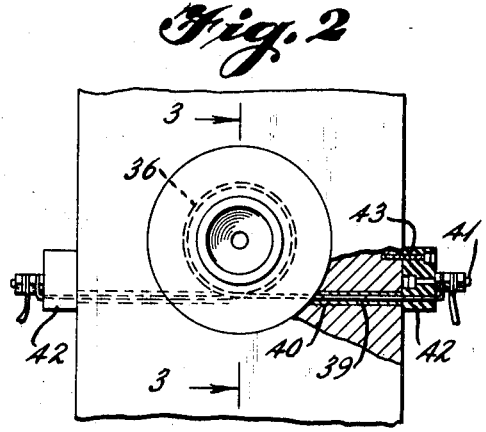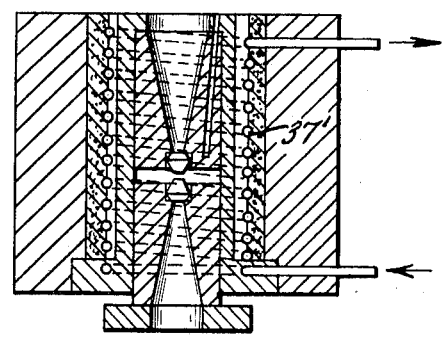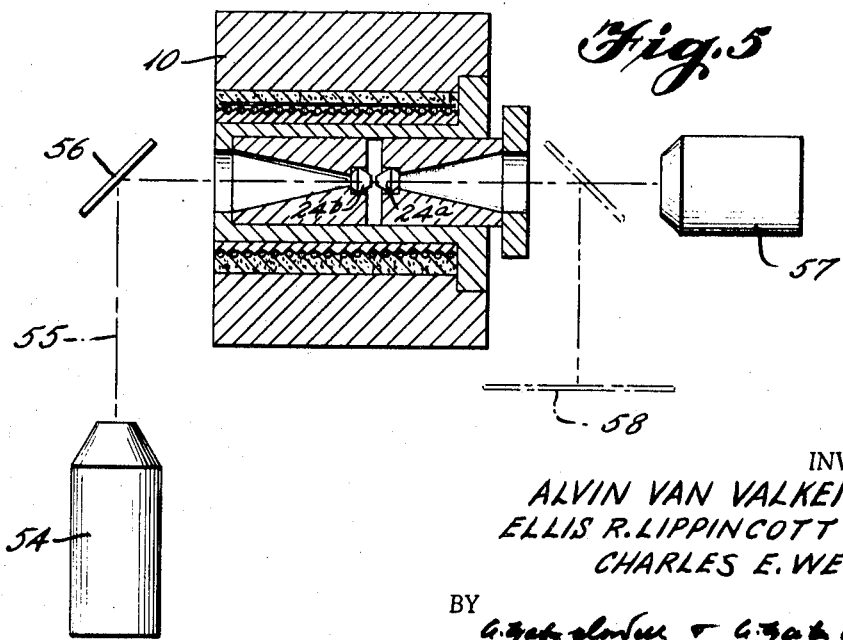

ABSTRACT OF THE DISCLOSURE

A high pressure optical cell has an insert and temperature varying means for the material tested, which may be a coil within the insert of insulating material or a laser beam with optical means for observation of the material.

---

This invention relates to analysis of materials under high pressures and more particularly to a high pressure optical cell of the type disclosed in our Pat. 3,079,505, dated Feb. 26, 1963.

In addition to changes in the mounting of the diamond holders, the present invention contemplates the provision of means for applying temperature variations to the material under examination in order that the combined effects of pressure and temperatures other than ambient may be analyzed.

Accordingly, it is an object of the invention to provide a high pressure optical cell having an improved diamond holder mounting and which provides for the localized application of temperature variations to material under examination, and for measurement of the temperature.

These and other objects of the invention will become apparent from the following description in conjunction with the accompanying drawings in which:

FIG. 1 is an elevation of the device in accordance with the invention;

FIG. 2, an enlarged plan view, with a portion broken away along the line 2—2 of FIG. 1;

FIG. 3, an enlarged section on the line 3—3 of FIG. 2;

FIG. 4, an enlarged section taken at 90° to FIG. 3 of a modification; and

FIG. 5, a schematic of a further modification.

Briefly stated, the mounting for the diamond holders has a secure press fit without the necessity of threading the parts. The mounting has a coil for the application of heat or cold. Alternatively, heat may be applied by means of laser energy. The diamond holder has a bore for receiving a temperature responsive device such as a thermocouple in order that temperatures may be accurately measured.

With further reference to the drawings, the high pressure optical cell is generally like that disclosed in our Pat. 3,079,505, particularly in the modification of FIG. 4. It includes a main body 10 which receives a threaded spindle 11 within a tapped bore 12. A calibrated spring 13 which is concentric about the spindle 11 abuts a head 14 of the spindle at one end and a collar 15 at its other. The collar abuts an upper thrust plate 16a through which the spindle passes. A lower thrust plate 16b is connected by arm 17a to the thrust plate 16a. The arm 17a is pivotally mounted on pin 19 whereby rotation of the spindle in one direction tends to move the thrust plate 16a downwardly as viewed in the drawings causing the thrust plate 16b to move upwardly.

The thrust plate 16b bears against a first diamond holder 20a, for diamond 24a, which is received within the bore of an insert or sleeve 30 having an inner bearing surface. Insert 30 has a flange 31 at one end which is snugly received within countersunk recess 31 of the main body 10, a press fit being preferred. The insert is of uniform bore except for a reduced extremity which provides an inwardly extending collar 32 at its remote end.

Mounted in the bore between the holder 20a and the collar 32 is a second diamond holder 20b, for diamond 24b, whose extremity which is remote from the diamond holder 20a abuts the collar 32.

In operation, the diamond holder 20b is positioned within the bore and abutting the collar 32. The material for examination is positioned on the face of the diamond 24b which is mounted therein, following which the diamond holder 20a with its diamond 24a is positioned in the bore. Pressure may then be applied through the arm 17a by operation of the spindle. The device may be positioned in such a way that optical observation of the material through the diamonds is accomplished.

In order that the effects upon the material being studied of temperatures other than the ambient may be observed, the present invention contemplates provision for heating or cooling the material. In the illustrated device the insert has a sleeve 34 with threads 35 on which a heating wire 36, such as nichrome, is wound in a coil. Strips of mica 37 or the like are cemented over the wire to hold it in place. There is a space 38 between the wire and the inner surface of the bore of the main body to provide clearance, and this may be filled with low heat conductive material such as pyrophyllite cement or the like. The coil is preferably close to the inner or bearing surface of the insert in order that relatively rapid transfer of heat from the coil to the diamond holders will occur. The heating coil, however, is substantially insulated from the main body, thereby avoiding overheating of such body.

The leads 39 to the coil 36 preferably pass through permanent type insulation such as porcelain tubes 40 which extend through the main body and are fastened to connecting posts 41 at its sides. The connecting posts 41 are received in mounting blocks 42 which are secured to the sides of the body by fasteners 43.

Instead of using electrical heating wire, tubes 37' may be mounted in the insert for carrying hot or cold fluids or liquids for the purpose of modifying or controlling the temperature of the material.

In order to determine accurately the temperature to which the material is exposed, a bore or well 50 is provided in one of the diamond holders 20b and a concentric bore 51 in the collar of the insert 30. By inserting a thermocouple in the bore, temperatures may be closely observed. In the type of analysis under consideration, the temperature measuring device or thermocouple may be calibrated by observing a phase change in a substance whose behavior is known, such as its melting point.

The invention also contemplates the use of other forms of energy for heating the material such as a laser beam. In such embodiment a laser source is indicated at 54, which projects a beam 55 against a reflector 56 which directs it through the material between the diamonds. At the opposite side of the optical cell an optical means such as an optical pyrometer 57 or a screen 58 is mounted in such a way as to permit observation of the material. The laser output must be of a frequency that is absorbed by the sample or the diamond in order for it to heat these components.

It will be obvious to one skilled in the art that various changes may be made in the described embodiment of the invention without departing from the spirit and scope thereof and therefore the invention is not limited by that which is illustrated in the drawings and described in the specification, but only as indicated in the accompanying claims.

What is claimed is:

1. In a high pressure cell in which a sample material is to be tested under conditions of high pressure and high temperature, said cell having a body with wall structure defining an opening extending therethrough, an insert located in said opening and having an axial bore within which a pair of holders are received, each of said holders supporting a generally transparent pressure-applying means substantially axially of said bore, said pressure-applying means facing each other and spaced apart a distance sufficient to receive the material being tested, force-applying means for moving one of said holders toward the other to apply pressure through said generally transparent pressure-applying means to the material; the imrovement comprising said insert having a generally cylindrical portion with means for mountnig said insert in fixed position within said opening; said generally cylindrical portion being spaced from the wall structure of the opening in said body, heating means disposed about the cylindrical portion of said insert and in engagement therewith for substantially the full length of said cylindrical portion, heat insulating means located between said heating means and the wall structure of the body opening to retard the transfer of heat to said body but permitting heat to be transferred to said insert and the material being tested, whereby the material can be tested and analyzed under high pressure and temperature.

2. The structure of claim 1 including sleeve means disposed about the cylindrical portion of said insert and in engagement therewith, and said heating means being carried by said sleeve means.

References Cited

UNITED STATES PATENTS

| 1,835,985 | 12/1931 | Henri | 356—246 |
| 2,744,440 | 5/1956 | Robertson et al. | 356—246 |
| 3,079,505 | 2/1963 | Weir et al. | 356—244X |
| 3,398,286 | 8/1968 | Ford et al. | 356—103X |
| 3,445,167 | 5/1969 | Armstrong et al. | 331—94.5X |
| 3,446,558 | 5/1969 | Seaton | 331—94.5X |

OTHER REFERENCES

Casassa, et al., J. Polymer Sci., v. XIV, pp. 385–389 (1954).

Leite, et al., App. Phys. Letters, v. 5, No. 7, pp. 141–143 (Oct. 1, 1964).

Damen et al., Phys. Rev. Letters, v. 14, No. 1, pp. 9–11 (Jan. 4, 1965).

Gordon et al., J. App. Phys., v. 36, No. 1, pp. 3–8 (January 1965).

Ashby et al., J. Sci. Inst., v. 42, No. 5, pp. 326–327 (May 1965).

Leite and Porto, J.O.S.A., v. 54, No. 8, pp. 981–983 (August 1964).

RONALD L. WIBERT, Primary Examiner

W. A. SKLAR, Assistant Examiner

U.S. Cl. X.R.

356—36, 244, 246